US012793691B2

(12) United States Patent
Jeong

(10) Patent No.: US 12,793,691 B2
(45) Date of Patent: Nov. 10, 2026

(54) ACTIVE NOISE CONTROL SYSTEM AND METHOD, AND VEHICLE INCLUDING SAME

(71) Applicants: Hyundai Motor Company, Seoul (KR); Kia Corporation, Seoul (KR)

(72) Inventor: Seok Hee Jeong, Hwaseong-Si (KR)

(73) Assignees: Hyundai Motor Company, Seoul (KR); ; Kia Corporation, Seoul (KR)

( * ) Notice: Subject to any disclaimer, the term of this patent is extended or adjusted under 35 U.S.C. 154(b) by 169 days.

(21) Appl. No.: 18/945,788

(22) Filed: Nov. 13, 2024

(65) Prior Publication Data

US 2025/0299666 A1 Sep. 25, 2025

(30) Foreign Application Priority Data

Mar. 22, 2024 (KR) ........................ 10-2024-0039805

(51) Int. Cl.
*G10K 11/178* (2006.01)

(52) U.S. Cl.
CPC .................. *G10K 11/17854* (2018.01); *G10K 2210/1282* (2013.01)

(58) Field of Classification Search
USPC ............ 381/56, 58, 71.1, 71.11, 71.14, 71.2, 381/71.4, 71.8
See application file for complete search history.

(56) References Cited

U.S. PATENT DOCUMENTS

2015/0003626 A1* 1/2015 Trammell ........ G10K 11/17825 381/71.7

FOREIGN PATENT DOCUMENTS

DE 102022103057 B3 * 5/2023 ....... G10K 11/17873
KR 10-2020-0035033 A 4/2020
KR 20240047615 A * 4/2024 ........... E01B 19/003

* cited by examiner

*Primary Examiner* — William A Jerez Lora
(74) *Attorney, Agent, or Firm* — Banner & Witcoff, Ltd.

(57) ABSTRACT

An apparatus for cancelling a noise signal may comprise a sensor configured to detect noise outside a vehicle and generate the noise signal associated with the detected noise. The apparatus may further comprise a first noise cancellation circuit to generate a first noise cancellation signal for a first frequency band and a second noise cancellation circuit to generate a second noise cancellation signal for a second frequency band. One or more processors, along with memory storing instructions, may control the first noise cancellation circuit to perform noise cancellation on the first noise signal in the first frequency band. Upon determining that the vehicle has entered an enclosed space, the second noise cancellation circuit may perform a second noise cancellation operation on the second noise signal in the second frequency band. The second frequency band corresponds to noise generated while the vehicle is within the enclosed space.

20 Claims, 3 Drawing Sheets

ACTIVE NOISE CONTROL SYSTEM AND METHOD, AND VEHICLE INCLUDING SAME

CROSS-REFERENCE TO RELATED APPLICATION(S)

This application claims the benefit of priority under 35 U.S.C. 119 to Korean Patent Application No. 10-2024-0039805, filed on Mar. 22, 2024, in the Korean Intellectual Property Office, the disclosure of which is herein incorporated by reference in its entirety.

TECHNICAL FIELD

The present disclosure relates to a technique for actively controlling noise occurring while driving a vehicle and, more particularly, to a system and a method for actively controlling not only noise (road noise) occurring due to a vehicle coming in contact with the ground but also noise (in-tunnel noise) occurring during driving in an enclosed space (e.g., a tunnel), and a vehicle including the same.

BACKGROUND

The matters described in this Background section are only for enhancement of understanding of the background of the disclosure, and should not be taken as acknowledgement that they correspond to prior art already known to those skilled in the art.

When driving a vehicle, noise (hereinafter, referred to as road noise or road surface noise) occurs due to the contact (or friction) between the vehicle and the road surface. Such noise may not only cause stress to the driver but also distract the driver, causing accidents. In addition, road noise may inconvenience a passenger watching movies, listening to music, or talking on the phone in the vehicle.

Accordingly, various studies are being conducted on technologies related to active noise control/cancellation (ANC).

If driving a vehicle, the vehicle may encounter a many number and long length of tunnels on roads. Not only high noise (in-tunnel noise) is generated but also a reflected sound field is formed in an enclosed space (e.g., a tunnel) due to the semi-closed spatial characteristics of a tunnel, resulting in sound frequency distortion.

Therefore, in research on vehicle-related active noise control, research considering control of in-tunnel noise may be useful.

SUMMARY

According to the present disclosure, an apparatus for cancelling a noise signal, the apparatus may comprise a sensor configured to detect noise outside a vehicle and generate the noise signal, wherein the noise signal is associated with the noise outside the vehicle, a first noise cancellation circuit to generate a first noise cancellation signal associated with a first frequency band, a second noise cancellation circuit to generate a second noise cancellation signal associated with a second frequency band, one or more processors, and memory storing instructions, when executed by the one or more processors, cause the apparatus to control the first noise cancellation circuit to perform a first noise cancellation operation on a first noise signal, of the noise signal, in the first frequency band, and control, based on a determination that the vehicle enters an enclosed space, the second noise cancellation circuit to perform a second noise cancellation operation on a second noise signal, of the noise signal, in the second frequency band, wherein the second frequency band is associated with a portion of the detected noise that is generated while the vehicle is within the enclosed space.

The apparatus, wherein the first frequency band may comprise a frequency band for road noise, and the second frequency band may comprise a frequency band for in-enclosed space noise.

The apparatus, wherein the first frequency band may comprise a first range of frequencies from 0 to 599 Hz and the second frequency band may comprise a second range of frequencies from 601 to 3000 Hz.

The apparatus, wherein the instructions, when executed by the one or more processors, further cause the apparatus to determine, based on enclosed space entry information, a first noise level before the vehicle enters the enclosed space and a second noise level after the vehicle enters the enclosed space, and control, based on a difference between the first noise level and the second noise level, the first noise cancellation operation and the second noise cancellation operation.

The apparatus, wherein the enclosed space entry information sequentially may comprise enclosed space entry expectation information, enclosed space entry start information, and enclosed space entry completion information, and wherein the instructions, when executed by the one or more processors, further cause the apparatus to determine a first level of a first noise signal input between a time of receiving the enclosed space entry expectation information and a time of receiving the enclosed space entry start information, and determine a second level of a second noise signal input between a time of receiving the enclosed space entry start information and a time of receiving the enclosed space entry completion information.

The apparatus, wherein the instructions, when executed by the one or more processors, further cause the apparatus to output, based on the difference between the first noise level and the second noise level, compensation level information, output, based on the compensation level information, a first noise cancellation sound, and output, based on the compensation level information, a second noise cancellation sound.

The apparatus, wherein the instructions, when executed by the one or more processors, further cause the apparatus to output, based on the second noise level being higher than the first noise level, upward compensation level information, and output, based on the second noise level being lower than the first noise level, downward compensation level information.

The apparatus, wherein the instructions, when executed by the one or more processors, further cause the apparatus to perform a noise cancellation operation by outputting a noise cancellation sound, wherein the noise cancellation sound may comprise an inverted phase relative to a noise signal to be cancelled, change, based on compensation level information, a level of the noise cancellation sound, and output the changed level of noise cancellation sound.

According to the present disclosure, a method performed by an apparatus for cancelling a noise signal, the method may comprise generating, based on a sensor of the apparatus detecting noise outside a vehicle, the noise signal, generating, by a first noise cancellation circuit of the apparatus, a first noise cancellation signal associated with a first frequency band, performing, by the first noise cancellation circuit of the apparatus, a first noise cancellation operation on a first noise signal, of the noise signal, in the first frequency band, generating, by a second noise cancellation circuit of the apparatus and based on a determination that the vehicle enters an enclosed space, a second noise cancellation signal associated with a second frequency band, and performing, by the second noise cancellation circuit of the apparatus and based on the determination that the vehicle enters an enclosed space, a second noise cancellation operation on a second noise signal, of the noise signal, in the second frequency band, wherein the second frequency band is associated with a portion of the detected noise that is generated while the vehicle is within the enclosed space.

The method, wherein the first frequency band may comprise a frequency band for road noise, and the second frequency band may comprise a frequency band for in-enclosed space noise.

The method may further comprise determining, based on enclosed space entry information, a first noise level before the vehicle enters the enclosed space and a second noise level after the vehicle enters the enclosed space, and controlling, based on a difference between the first noise level and the second noise level, the first noise cancellation operation and the second noise cancellation operation.

The method, wherein the enclosed space entry information sequentially may comprise enclosed space entry expectation information, enclosed space entry start information, and enclosed space entry completion information, and wherein the determining the first noise level before the vehicle enters the enclosed space and the second noise level after the vehicle enters the enclosed space may comprise determining a first level of a first noise signal input between a time of receiving the enclosed space entry expectation information and a time of receiving the enclosed space entry start information, and determining a second level of a second noise signal input between a time of receiving the enclosed space entry start information and a time of receiving the enclosed space entry completion information.

The method, wherein the controlling the first noise cancellation operation and the second noise cancellation operation may comprise outputting, based on the difference between the first noise level and the second noise level, compensation level information, and changing, based on the compensation level information, a level of an output noise cancellation sound.

The method, wherein the controlling the first noise cancellation operation and the second noise cancellation operation may comprise outputting, based on the second noise level being higher than the first noise level, upward compensation level information, and outputting, based on the second noise level being lower than the first noise level, downward compensation level information.

The method, wherein the performing the first noise cancellation operation may comprise outputting a first noise cancellation sound, wherein the first noise cancellation sound may comprise an inverted phase relative to the first noise signal in the first frequency band, and wherein the performing the second noise cancellation operation may comprise outputting a second noise cancellation sound, wherein the second noise cancellation sound may comprise an inverted phase relative to the second noise signal in the second frequency band, may further comprise outputting, based on compensation level information, the first noise cancellation sound and the second noise cancellation sound by changing a first level of the first noise cancellation sound and a second level of the second noise cancellation sound.

According to the present disclosure, a non-transitory computer-readable medium storing instructions for cancelling a noise signal, that when executed, cause a sensor of an apparatus to detect noise outside a vehicle and generate the noise signal, wherein the noise signal is associated with the noise outside the vehicle, a first noise cancellation circuit of the apparatus to perform a first noise cancellation operation on a first noise signal, of the noise signal, in a first frequency band, and generate a first noise cancellation signal associated with the first frequency band, a second noise cancellation circuit of the apparatus to perform, based on a determination that the vehicle enters an enclosed space, a second noise cancellation operation on a second noise signal, of the noise signal, in a second frequency band, and generate a second noise cancellation signal associated with the second frequency band, wherein the second frequency band is associated with a portion of the detected noise that is generated while the vehicle is within the enclosed space. The non-transitory computer-readable medium, wherein the first frequency band may comprise a frequency band for road noise, and the second frequency band may comprise a frequency band for in-enclosed space noise.

The non-transitory computer-readable medium, wherein the instructions, when executed, cause the apparatus to determine, based on enclosed space entry information, a first noise level before the vehicle enters the enclosed space and a second noise level after the vehicle enters the enclosed space, and control, based on a difference between the first noise level and the second noise level, the first noise cancellation operation and the second noise cancellation operation.

The non-transitory computer-readable medium, wherein the enclosed space entry information sequentially may comprise enclosed space entry expectation information, enclosed space entry start information, and enclosed space entry completion information, and wherein the instructions, when executed, cause the apparatus to determine the first noise level before the vehicle enters the enclosed space and the second noise level after the vehicle enters the enclosed space by determining a first level of a first noise signal input between a time of receiving the enclosed space entry expectation information and a time of receiving the enclosed space entry start information, and determining a second level of a second noise signal input between a time of receiving the enclosed space entry start information and a time of receiving the enclosed space entry completion information.

The non-transitory computer-readable medium, wherein the instructions, when executed, cause the apparatus to control the first noise cancellation operation and the second noise cancellation operation by outputting, based on the difference between the first noise level and the second noise level, compensation level information, and changing, based on the compensation level information, a level of an output noise cancellation sound.

BRIEF DESCRIPTION OF THE DRAWINGS

The accompanying drawings are intended to aid understanding of examples of the present disclosure, and provide examples along with a detailed description. However, the technical features of the examples are not limited to specific drawings, and features disclosed in the respective drawings may be combined to form a new example.

DETAILED DESCRIPTION

Figure 1:
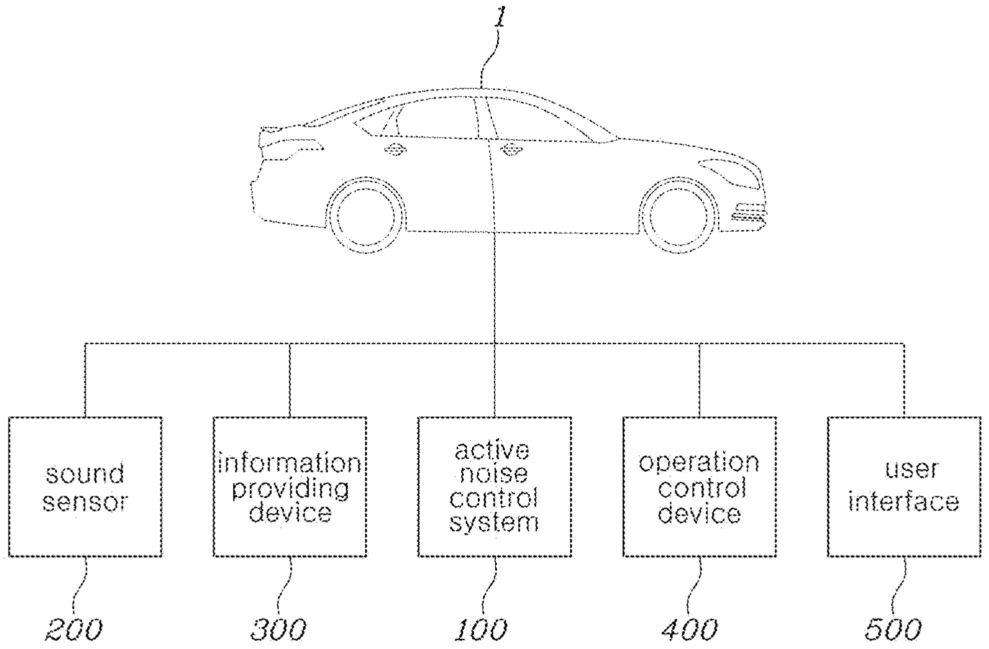
FIG. 1 shows an example of a vehicle 1 including an active noise control system 100 according to an example of the present disclosure.

The advantages and features of the present disclosure and ways to achieve them will be apparent by referring to examples as described below in detail in conjunction with the accompanying drawings. However, the present disclosure is not limited to the examples set forth below, but may be implemented in various different forms. The following examples are provided only to completely set forth the disclosure and inform those skilled in the art of the scope of the present disclosure, and the present disclosure is defined only by the scope of the appended claims.

Shapes, sizes, ratios, angles, and numbers disclosed in the drawings for explanation of examples of the present disclosure are provided merely by way of example, and thus the present disclosure is not limited to those shown in the drawings. Throughout the specification, the same or like reference signs indicate the same or like elements. Furthermore, in describing the present disclosure, if it is determined that the detailed description of the known relevant arts unnecessarily obscures the subject matter of the present disclosure, the detailed description will be omitted. In the case where the expressions "comprise," "have," and "include" mentioned in the specification are used, another part may be added unless the term "only'" is used. An element expressed in a singular form may include plural forms unless definitely indicated otherwise.

In construing an element, the element is to be construed as covering an error range although there is no explicit description of the error range.

In describing a temporal relationship, if a temporal order is described using, for example, "after," "subsequent to," "next to," or "before," the temporal order may include cases which are not continuous unless the term "just" or "immediately" is used.

The terms "first," "second," and the like may be used to describe various elements, but the elements are not limited by these terms. These terms are used merely to distinguish one element from the others. Therefore, a first element as used in the following description may be a second element without departing from the spirit of the present disclosure.

In describing the elements of the present disclosure, such terms as "first," "second," "A," "B," "(a)," and "(b)" may be used. These terms are used merely to discern the corresponding elements from the other elements, and the essence, sequence, order, or number of the corresponding elements are not limited by the terms. It will be understood that if an element is referred to as being "connected to" or "coupled to" another element, the element may be directly connected to or coupled to the other element, but yet another element may be interposed between the respective elements that may be connected or coupled indirectly to each other.

The term "at least one" should be understood as including any or all combinations of one or more of the associated elements enumerated. For example, "at least one of a first element, a second element, and a third element" may mean not only the first element, the second element, or the third element, but also all combinations of two or more of the first element, the second element, and the third element.

The respective features of various examples of the present disclosure may be partially or entirely coupled to or combined with each other and may be technically linked and inter-operated with each other in various manners, and the respective examples of the present disclosure may be carried out independently of each other or may be carried out in association with each other.

For the convenience of description, the scale of elements shown in the drawings may differ from the real scale, and thus the elements are not limited by the scale shown in the drawings.

Hereinafter, an active noise control system, an active noise control method, and a vehicle including the same according to examples of the present disclosure will be described with reference to the accompanying drawings.

FIG. 1 shows an example of a vehicle 1 including an active noise control system 100 according to an example of the present disclosure.

Referring to FIG. 1, the vehicle 1 may include the active noise control system 100 according to an example of the present disclosure.

Further, the vehicle 1 may include a sound sensor 200 (e.g., micro-electromechanical system microphone, electret condenser microphone, piezoelectric microphone, or sound level meter, etc.) that provides a noise signal corresponding to noise input from the outside of the vehicle 1 to the active noise control system 100 and an information providing device 300 that outputs tunnel entry information to the active noise control (ANC) system 100. The ANC system 100 may capture ambient sound noise around a user (e.g., hum of an engine or chatter in a crowded room), process the captured ambient sound noise to create an inverse sound wave (e.g., anti-noise) that matches the frequency of the ambient sound noise, and play the anti-noise to cancel out the ambient sound noise.

The active noise control system 100 may generate a first noise cancellation signal with an inverted phase relative to a noise signal in a first frequency band preset to cancel road noise among noise signals input from the sound sensor 200, and may output a sound (first noise cancellation sound) corresponding to the generated first noise cancellation signal (road noise cancellation operation or first noise cancellation operation).

For example, the active noise control system 100 may perform the road noise cancellation operation, based on an already known feed-forward active noise control/cancellation (feed-forward ANC) algorithm.

The active noise control system 100 may generate a second noise cancellation signal with an inverted phase relative to a noise signal in a second frequency band preset to cancel in-tunnel noise among the noise signals input from the sound sensor 200, and may output a sound (second noise cancellation sound) corresponding to the generated second noise cancellation signal (in-tunnel noise cancellation operation or second noise cancellation operation).

For example, the active noise control system 100 may perform the in-tunnel noise cancellation operation, based on an already known feedback active noise control/cancellation (feedback ANC) algorithm.

According to an example, the first frequency band may include a frequency band with respect to road noise, and the second frequency band may include a frequency band with respect to in-tunnel noise. For example, the first frequency band may be a low sound frequency band, and the second frequency band may be a medium sound frequency band. For example, the low sound frequency band may be 0 to 600 Hz and the medium sound frequency band may be 600 to 3000 Hz, but the low sound frequency band and the medium sound frequency band are not limited to this example.

For example, the low sound frequency band may be set based on analysis of road noise obtained through a vehicle driving test, and the medium sound frequency band may be set based on analysis of in-tunnel noise obtained through a vehicle driving test.

According to an example, the active noise control system 100 may perform a road noise cancellation operation regardless of whether tunnel entry information provided from the information providing device 300 is received. According to an example, when receiving tunnel entry information from the information providing device 300, the active noise control system 100 may perform an in-tunnel noise cancellation operation.

That is, the active noise control system 100 may perform a road noise cancellation operation both if the vehicle 1 is located inside a tunnel and if the vehicle 1 is located outside a tunnel, and may perform an in-tunnel noise cancellation operation if the vehicle 1 enters a tunnel.

When receiving tunnel entry information from the information providing device 300, the active noise control system 100 may determine the level of a noise signal.

For example, the tunnel entry information may include a plurality of pieces of information related to tunnel entry. For example, the tunnel entry information may include tunnel entry expectation information provided if the vehicle 1 reaches a preset distance before entering a tunnel, tunnel entry start information provided if the vehicle 1 passes through the entrance to the tunnel, tunnel entry completion information provided if the vehicle 1 reaches a preset distance after entering the tunnel, tunnel passage completion information provided if the vehicle 1 has completely passed through the tunnel, and the like.

For example, the active noise control system 100 may determine the level (e.g., 70 dB-140 dB) of a noise signal (noise signal before entry into the tunnel) input between the time of receiving the tunnel entry expectation information and the time of receiving the tunnel entry start information. For example, the active noise control system 100 may determine the average of levels of noise signals input between the time of receiving the tunnel entry expectation information and the time of receiving the tunnel entry start information.

That is, the active noise control system 100 may determine the level of one noise signal among noise signals before the entry into the tunnel, or may determine the average of levels of a plurality of noise signals.

For example, the active noise control system 100 may determine the level of a noise signal (noise signal after the entry into the tunnel) input between the time of receiving the tunnel entry start information and the time of receiving the tunnel entry completion information. For example, the active noise control system 100 may determine the average of levels of noise signals input between the time of receiving the tunnel entry start information and the time of receiving the tunnel entry completion information.

That is, the active noise control system 100 may determine the level of one noise signal among noise signals after the entry into the tunnel, or may determine the average of levels of a plurality of noise signals.

As described above, the active noise control system 100 may determine the levels or average level of the noise signals before and after the entry into the tunnel.

According to the example, the active noise control system 100 may determine a compensation level, based on the levels or average level of the noise signals before and after the entry into the tunnel.

The active noise control system 100 may compensate for the level of the first noise cancellation sound to output the first noise cancellation sound or compensate for the level of second noise cancellation sound to output the second noise cancellation sound, based on the determined compensation level.

For example, the active noise control system 100 may determine the compensation level by subtracting the level of the noise signal after the entry into the tunnel from the level of the noise signal before the entry into the tunnel. The active noise control system 100 may determine the compensation level by subtracting the level of the noise signal after the entry into the tunnel from the average level of the noise signals before the entry into the tunnel.

For example, if the determined compensation level is a positive (+) value, the active noise control system 100 may increase the level of the first noise cancellation sound or the level of the second noise cancellation sound by the compensation level. If the determined compensation level is a negative (−) value, the active noise control system 100 may reduce the level of the first noise cancellation sound or the level of the second noise cancellation sound by the compensation level.

The sound sensor 200 according to an example may be installed in the vehicle 1 (e.g., the side mirrors, under the hood, on the roof, near the wheel wells, or on the rear bumper of the vehicle 1, etc.), and may provide noise input from the outside of the vehicle 1 to the active noise control system 100.

The installation position of the sound sensor 200 is not limited. For example, the sound sensor 200 may be installed in the vehicle 1 to effectively obtain noise outside the vehicle.

For example, the sound sensor 200 may include a microphone (or mike), a micro-electromechanical system (MEMS)-type acceleration sensor, and the like, but the configuration of the sound sensor 200 is not limited thereto.

The information providing device 300 according to an example may provide information related to tunnel entry to the active noise control system 100.

The information providing device 300 may be, for example, a head unit, but is not limited to this type. The information providing device 300 may be any device that is installed in the vehicle 1 to provide information related to tunnel entry.

The information providing device 300 may provide tunnel entry information to the active noise control system 100 according to pre-settings.

According to an example, the information providing device 300 may provide tunnel entry expectation information to the active noise control system 100 if the vehicle 1 reaches a preset distance before entering a tunnel (e.g., 10 m before entering the tunnel). For example, the tunnel entry expectation information may be a signal having a preset first level.

According to an example, the information providing device 300 may provide tunnel entry start information to the active noise control system 100 if the vehicle 1 passes through the entrance to the tunnel. For example, the tunnel entry start information may be a signal having a preset second level.

For example, the vehicle 1 passing through the entrance to the tunnel may refer to a case where the front bumper of the vehicle 1 passes through the entrance to the tunnel or a case where the entire vehicle 1 passes through the entrance to the tunnel, and determining that the vehicle 1 passes through the entrance to the tunnel is not limited thereto.

According to an example, the information providing device 300 may provide tunnel entry completion information to the active noise control system 100 if the vehicle 1 reaches a preset distance after entering the tunnel (e.g., 10 m after entering the tunnel). For example, the tunnel entry completion information may be a signal having a preset third level.

According to an example, the information providing device 300 may provide tunnel passage completion information to the active noise control system 100 if the vehicle 1 has completely passed through the tunnel. For example, the tunnel passage completion information may be a signal having a preset fourth level.

According to an example, the vehicle 1 may include an operation control device 400 to control the start and end of an operation of the active noise control system 100. For example, the operation control device 400 may output an operation start signal or an operation end signal to the active noise control system 100. For example, the operation control device 400 may output an ignition-on signal as the operation start signal or an ignition-off signal as the operation end signal to the active noise control system 100.

According to an example, the vehicle 1 may include a user interface 500 (e.g., graphical user interface (GUI) like a touch screen) to control the start of performance of a noise compensation function of the active noise control system 100.

For example, the user interface 500 may receive an input as to whether the noise compensation function is activated from a user and output a noise compensation function activation signal to the active noise control system 100, thereby enabling the active noise control system 100 to perform the noise compensation function.

Figure 2:
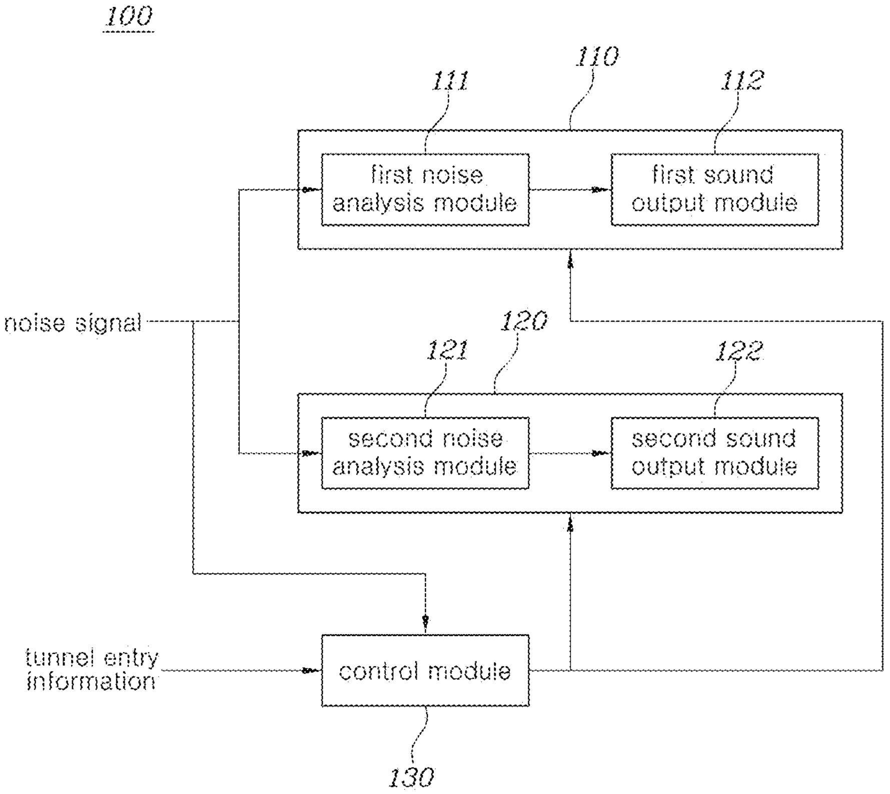
FIG. 2 shows an example of the configuration of an active noise control system 100 according to an example of the present disclosure.

FIG. 2 shows an example of the configuration of an active noise control system 100 according to an example of the present disclosure.

Referring to FIG. 1 and FIG. 2, the active noise control system 100 according to the example of the present disclosure may include a first noise cancellation module (or road noise cancellation module) 110, a second noise cancellation module (or tunnel noise cancellation module), and a control module 130, but the configuration of the active noise control system 100 is not limited thereto.

The first noise cancellation module 110 may generate a first noise cancellation signal with an inverted phase relative to a noise signal in a first frequency band preset to cancel road noise among noise signals, and may output a sound (first noise cancellation sound) corresponding to the generated first noise cancellation signal (road noise cancellation operation or first noise cancellation operation).

For example, the first noise cancellation module 110 may perform the road noise cancellation operation, based on an already known feed-forward active noise control/cancellation (feed-forward ANC) algorithm.

The first noise cancellation module 110 may change the level of the first noise cancellation sound and output the first noise cancellation sound according to control of the control module 130.

The first noise cancellation module 110 may start the road noise cancellation operation when receiving an operation-on signal from the control module 130, and may end the road noise cancellation operation when receiving an operation-off signal from the control module 130.

According to the example, the first noise cancellation module 110 may include a first noise analysis module 111 and a first sound output module 112.

The first noise analysis module 111 may perform frequency analysis on the input noise signals, and may generate the first noise cancellation signal for the noise signal in the preset first frequency band among the noise signals. The first noise cancellation signal has the inverted phase relative to the noise signal in the first frequency band.

In an example, the first noise analysis module 111 may be a component that generates and outputs the first noise cancellation signal for cancelling road noise, and the first frequency band may be a low sound frequency band, and may be set based on frequency analysis of road noise obtained through a vehicle driving test.

The first noise analysis module 111 may generate the first noise cancellation signal having the inverted phase relative to the noise signal in the first frequency band, and may output the first noise cancellation signal to the first sound output module 112.

The first sound output module 112 may receive the first noise cancellation signal output from the first noise analysis module 111, and may output the sound (first noise cancellation sound) corresponding to the first noise cancellation signal.

The first sound output module 112 may change the level of the first noise cancellation sound, based on compensation level information output from the control module 130, and may output the first noise cancellation sound with the changed level.

For example, the first sound output module 112 may include a speaker suitable for outputting a low-frequency sound. For example, the speaker may include a subwoofer, but the configuration of the first sound output module 112 is not limited thereto.

The second noise cancellation module 120 may perform an in-tunnel noise cancellation operation (or second noise cancellation operation) according to control of the control module 130. For example, the second noise cancellation module 120 may perform the in-tunnel noise cancellation operation when receiving an operation-on signal from the control module 130. For example, the second noise cancellation module 120 may end the in-tunnel noise cancellation operation when receiving an operation-off signal from the control module 130.

The second noise cancellation module 120 may generate a second noise cancellation signal with an inverted phase relative to a noise signal in a second frequency band preset to cancel in-tunnel noise among noise signals, and may output a sound (second noise cancellation sound) corresponding to the generated second noise cancellation signal (in-tunnel noise cancellation operation).

For example, the second noise cancellation module 120 may perform the in-tunnel noise cancellation operation, based on an already known feedback active noise control/cancellation (feedback ANC) algorithm.

The second noise cancellation module 120 may change the level of the second noise cancellation sound and output the second noise cancellation sound according to control of the control module 130.

According to the example, the second noise cancellation module 120 may include a second noise analysis module 121 and a second sound output module 122.

The second noise analysis module 121 may perform frequency analysis on the input noise signal, and may generate the second noise cancellation signal for the noise signal in the preset second frequency band among the noise signals. The second noise cancellation signal has the inverted phase relative to the noise signal in the second frequency band.

In an example, the second noise analysis module 121 may be a component that generates and outputs the second noise cancellation signal to cancel in-tunnel noise, and the second frequency band may be a medium sound frequency band, and may be set based on frequency analysis of in-tunnel noise obtained through a vehicle driving test.

The second noise analysis module 121 may generate the second noise cancellation signal having the inverted phase relative to the noise signal in the second frequency band, and may output the second noise cancellation signal to the second sound output module 122.

The second sound output module 122 may receive the second noise cancellation signal output from the second noise analysis module 121, and may output the sound (second noise cancellation sound) corresponding to the second noise cancellation signal.

The second sound output module 122 may change the level of the second noise cancellation sound, based on the compensation level information output from the control module 130, and may output the second noise cancellation sound with the changed level.

For example, the second sound output module 122 may include a speaker suitable for outputting a medium-frequency sound. For example, the speaker may include a midrange speaker, but the configuration of the second sound output module 122 is not limited thereto.

The control module 130 may control the first noise cancellation module 110 to perform the noise cancellation operation both if the vehicle 1 is located inside a tunnel and if the vehicle 1 is located outside a tunnel, and may control the second noise cancellation module 120 to perform the noise cancellation operation only if the vehicle 1 enters a tunnel.

The control module 130 may control the start and end of an operation of the first noise cancellation module 110, based on an operation start signal or an operation end signal provided from the operation control device 400.

According to an example, the control module 130 may output an operation-on signal to the first noise cancellation module 110 when receiving the operation start signal from the operation control device 400, and may output an operation-off signal to the first noise cancellation module 110 when receiving the operation end signal from the operation control device 400.

The control module 130 may control the first noise cancellation module 110 and the second noise cancellation module 120, based on tunnel entry information provided from the information providing device 300.

For example, when receiving a noise compensation function activation signal output from the user interface 500, the control module 130 may perform a noise compensation function, based on the tunnel entry information.

The control module 130 may be provided with tunnel entry expectation information, tunnel entry start information, tunnel entry completion information, and tunnel passage completion information as the tunnel entry information from the information providing device 300.

The control module 130 may control the start and end of an operation of the second noise cancellation module 120, based on the tunnel entry expectation information and the tunnel passage completion information.

According to an example, when receiving the tunnel entry expectation information, the control module 130 may output an operation-on signal to the second noise cancellation module 120 to control the start of the operation of the second noise cancellation module 120.

When receiving the tunnel passage completion information, the control module 130 may output an operation-on signal to the second noise cancellation module 120 to control the end of the operation of the second noise cancellation module 120.

When receiving the tunnel entry information, the control module 130 may determine noise levels before and after entry into the tunnel, and may determine a compensation level, based on the noise levels before and after the entry into the tunnel.

According to an example, the control module 130 may determine the level of a noise signal (noise signal before the entry into the tunnel) input between the time of receiving the tunnel entry expectation information and the time of receiving the tunnel entry start information.

For example, the control module 130 may determine the level of one noise signal among noise signals before the entry into the tunnel, or may determine the average of levels of a plurality of noise signals.

According to an example, the control module 130 may determine the level of a noise signal (noise signal after the entry into the tunnel) input between the time of receiving the tunnel entry start information and the time of receiving the tunnel entry completion information.

For example, the control module 130 may determine the level of one noise signal among noise signals after the entry into the tunnel, or may determine the average of levels of a plurality of noise signals.

As described above, the control module 130 may determine the levels or average level of the noise signals before and after the entry into the tunnel.

The control module 130 may determine the compensation level, based on the levels or average level of the noise signal before and after the entry into the tunnel.

For example, the control module 130 may determine the compensation level by subtracting the level of the noise signal after the entry into the tunnel from the level of the noise signal before the entry into the tunnel. Alternatively, the control module 130 may determine the compensation level by subtracting the level of the noise signal after the entry into the tunnel from the average level of the noise signals before the entry into the tunnel.

A method by which the control module 130 determines the compensation level is not limited thereto. For example, the control module 130 may determine the compensation level by subtracting the level (or average level) of the noise signal before the entry into the tunnel from the level (or average level) of the noise signal after the entry into the tunnel.

The control module 130 may control the first noise cancellation module 110 and the second noise cancellation module 120, based on compensation level information.

According to an example, the control module 130 may output the compensation level information to the first sound output module 112 of the first noise cancellation module 110 so that the first sound output module 112 outputs the first noise cancellation sound by changing the level of the first noise cancellation sound.

The control module 130 may output the compensation level information to the second sound output module 122 of the second noise cancellation module 120 so that the second sound output module 122 outputs the second noise cancellation sound by changing the level of the second noise cancellation sound.

According to an example, if the level (or average level) of the noise signal after the entry into the tunnel increases compared to the level (or average level) of the noise signal before the entry into the tunnel, the control module 130 may output upward compensation level information corresponding to an increased amount in the level to the first sound output module 112 and the second sound output module 122.

If the level (or average level) of the noise signal after the entry into the tunnel decreases compared to the level (or average level) of the noise signal before the entry into the tunnel, the control module 130 may output downward compensation level information corresponding to a decreased amount in the level to the first sound output module 112 and the second sound output module 122.

For example, the control module 130 may include a module ("input module") connected to the sound sensor 200 to receive noise, a module ("first reception module") connected to the information providing device 300 to receive tunnel entry information, a module ("second reception module") connected to the operation control device 400 to receive an operation control signal (including an operation start signal and an operation end signals), a module ("third reception module") connected to the user interface 500 to receive a noise compensation function activation signal, a memory that stores instruction (e.g., an active noise control algorithm) for an operation of the control module 130, and a processor that performs active noise control according to the active noise control algorithm stored in the memory.

According to an example, an Advanced Noise Cancellation (ANC) system may begin with noise being picked up by an Active Noise Control/Reduction (ANCR) Microphone. This microphone records ambient noise, which is then analyzed through various channels, such as Road Noise Analysis (Low Frequency) and Tunnel Noise Analysis (High Frequency). This analysis may involve Spectrogram Analysis, which may be performed using tools like MATLAB, Audacity, Praat, Python Libraries, WaveSurfer, Adobe Audition, or Sound Forge, to understand the noise characteristics. The ANC system may further utilize an Amplifier (AMP) to process the noise signals. These processed signals may be then sent to Subwoofers and Midrange/Door Speakers for noise cancellation at specific frequencies (e.g., Noise Cancellation around 400 Hz via the subwoofer, and Noise Cancellation around 3 kHz via the midrange/door speakers). Additionally or alternatively, the ANC system may use a Head Unit (HU) to gather tunnel information, which is useful for tunnel-specific noise analysis and compensation. When the vehicle enters a tunnel, the HU interacts with the AMP to calculate and adjust the sound energy according to the tunnel conditions. The processed and compensated sound may be sent to the Front Speakers, ensuring that the sound levels are optimally adjusted for the tunnel environment, thereby maintaining effective noise control even under challenging conditions.

Figure 3:
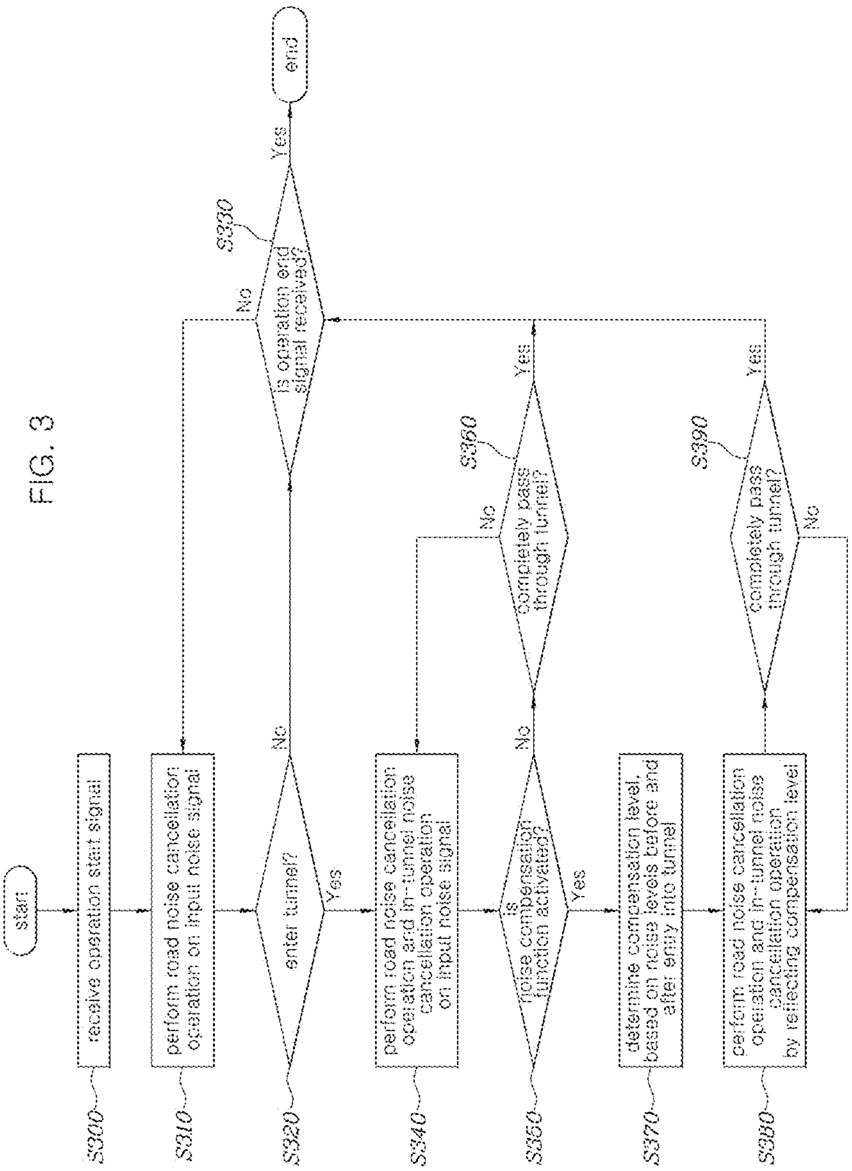
FIG. 3 shows an example of an active noise control method according to an example of the present disclosure.

FIG. 3 shows an example of an active noise control method according to an example of the present disclosure. For convenience, FIG. 3 is described by way of an example in which the steps are performed by a processor (e.g., control circuitry). One, some, or all steps of the example method of FIG. 3, or portions thereof, may be performed by one or more other circuits. One or some, steps of the example method of FIG. 3 may be omitted, performed in other orders, and/or otherwise modified, and/or one or more additional steps may be added. Alternatively or additionally, each operation shown in FIG. 3 may be performed by the active noise control system 100 described with reference to FIG. 1 and FIG. 2.

Referring to FIG. 1 to FIG. 3, when receiving an operation start signal (S300), the active noise control system 100 may perform a road noise cancellation operation on an input noise signal (S310).

In operation S310, the active noise control system 100 may perform the road noise cancellation operation by using the first noise cancellation module 110 (S310).

In operation S310, the active noise control system 100 may generate a first noise cancellation signal with an inverted phase relative to a noise signal in a first frequency band preset to cancel road noise among noise signals by using the first noise analysis module 111, and may output a sound (first noise cancellation sound) corresponding to the generated first noise cancellation signal through the first sound output module 112.

After operation S310, the active noise control system 100 may determine whether the vehicle 1 enters a tunnel (S320).

In operation S320, the active noise control system 100 may determine whether the vehicle 1 enters the tunnel, based on whether tunnel entry information is received from the information providing device 300.

As a result of the determination in operation S320, if determining that the vehicle 1 does not enter the tunnel (No in S320), that is, if no tunnel entry information is received from the information providing device 300, the active noise control system 100 may determine whether an operation end signal is received (S330).

When receiving the operation end signal (Yes in S330), the active noise control system 100 may end an active noise control operation.

When not receiving the operation end signal (No in S330), the active noise control system 100 may perform a road noise cancellation operation according to operation S310.

As a result of the determination in operation S320, when determining that the vehicle 1 enters the tunnel (Yes in S320), that is, if the tunnel entry information (specifically, tunnel entry expectation information) is received from the information providing device 300, the active noise control system 100 may perform the road noise cancellation operation and an in-tunnel noise cancellation operation with respect to an input noise signal (S340).

In operation S340, the active noise control system 100 may perform the road noise cancellation operation by using the first noise cancellation module 110, and may perform the in-tunnel noise cancellation operation by using the second noise cancellation module 120.

In operation S340, the active noise control system 100 may generate the first noise cancellation signal with the inverted phase relative to the noise signal in the first frequency band preset to cancel road noise among noise signals by using the first noise analysis module 111, and may output the sound (first noise cancellation sound) corresponding to the generated first noise cancellation signal through the first sound output module 112.

Further, the active noise control system 100 may generate a second noise cancellation signal with an inverted phase relative to a noise signal in a second frequency band preset to cancel in-tunnel noise among the noise signals by using the second noise analysis module 121, and may output a sound (second noise cancellation sound) corresponding to the generated second noise cancellation signal through the second sound output module 122. The terms such as "device," "unit," "module," and the like refer to one or more components for processing at least one function or operation, which may be implemented by hardware (e.g., circuit, circuitry, ASIC), software, or a combination thereof.

After operation S340, the active noise control system 100 may determine whether a noise compensation function is activated (S350).

In operation S350, the active noise control system 100 may determine whether the noise compensation function is activated, based on whether a noise compensation function activation signal is received from the user interface 500.

As a result of the determination in operation S350, if determining that the noise compensation function is not activated (No in S350), that is, if no noise compensation function activation signal is received from the user interface 500, the active noise control system 100 may determine whether the vehicle 1 has passed through the tunnel (S360).

In operation S360, the active noise control system 100 may determine whether the vehicle 1 has passed through the tunnel, based on whether tunnel entry information (specifically, tunnel passage completion information) is received from the information providing device 300.

The active noise control system 100 may perform the road noise cancellation operation and the in-tunnel noise cancellation operation according to operation S340 if the vehicle 1 has not passed through the tunnel (No in S360), and may determine whether an operation end signal is received according to operation S330 if the vehicle 1 has passed through the tunnel (Yes in S360).

As a result of the determination in operation S350, if determining that the noise compensation function is activated (Yes in S350), the active noise control system 100 may determine a compensation level, based on noise levels before and after entry into the tunnel (S370).

In operation S370, the active noise control system 100 may determine the level (or average level) of a noise signal (noise signal before the entry into the tunnel) input between the time of receiving the tunnel entry expectation information and the time of receiving tunnel entry start information from the information providing device 300.

In operation S370, the active noise control system 100 may determine the level (or average level) of a noise signal (noise signal after the entry into the tunnel) input between the time of receiving the tunnel entry start information and the time of receiving tunnel entry completion information from the information providing device 300.

In operation S370, the active noise control system 100 may determine the compensation level, based on the levels (or average levels) of the noise signals before and after the entry into the tunnel according to a preset algorithm.

For example, the active noise control system 100 may determine the compensation level, based on the difference between the levels (or average levels) of the noise signals before and after the entry into the tunnel.

After operation S370, the active noise control system 100 may perform the road noise cancellation operation and the in-tunnel noise cancellation operation by reflecting the compensation level (S380).

In operation S380, if the level (or average level) of the noise signal after the entry into the tunnel increases compared to the level (or average level) of the noise signal before the entry into the tunnel, the active noise control system 100 may increase the levels of the first and second noise cancellation sounds by an increased amount to output the first and second noise cancellation sounds.

In operation S380, if the level (or average level) of the noise signal after the entry into the tunnel decreases compared to the level (or average level) of the noise signal before the entry into the tunnel, the active noise control system 100 may decrease the levels of the first and second noise cancellation sounds by a decreased amount to output the first and second noise cancellation sounds.

At least some of the components described in the examples of the present disclosure may be implemented by a hardware element including at least one of a digital signal processor (DSP), a processor, a controller, an application-specific IC (ASIC), a programmable logic device (FPGA, or the like), and other electronic devices, or a combination thereof. Additionally, at least some of the functions or processes described in the examples may be implemented as software, and the software may be stored in a non-transitory recording medium. At least some of the components, functions, and processes described in examples of the present disclosure may be implemented through a combination of hardware and software.

Examples disclosed herein have been made to meet the foregoing requirement in the prior art, and technical examples are to provide a system and a method for actively controlling not only noise (road noise) occurring due to a vehicle coming in contact with the ground but also noise (in-tunnel noise) occurring during driving in a tunnel, and a vehicle including the same.

Other technical examples are to provide a system and a method for actively controlling not only road noise but also in-tunnel noise by using a microphone used for conventional active noise control, and a vehicle including the same.

Still other technical examples are to provide a system and a method for automatically controlling in-tunnel noise without any additional microphone/cost increase when entering into a tunnel, and a vehicle including the same.

Yet other technical examples are to provide a system and a method for effectively controlling road noise and in-tunnel noise by reflecting the difference between noise levels before and after entry into a tunnel, and a vehicle including the same.

The technical subjects of the present disclosure may not be limited to the above-mentioned technical subjects, and other subjects intended by the present disclosure may be clearly understood, through the following descriptions, by those skilled in the art to which the present disclosure pertains.

To achieve the foregoing technical examples, there may be provided a system and a method for actively controlling not only noise (road noise) occurring due to a vehicle coming in contact with the ground but also noise (in-tunnel noise) occurring during driving in a tunnel, and a vehicle including the same.

Further, there may be provided a system and a method for effectively controlling road noise and in-tunnel noise by reflecting the difference between noise levels before and after entry into a tunnel, and a vehicle including the same.

An active noise control system according to an example of the present disclosure is an active noise control system for cancelling a noise signal provided by a sound sensor receiving noise outside a vehicle, which may include a first noise cancellation module that performs a first noise cancellation operation on a noise signal in a preset first frequency band among the noise signal, a second noise cancellation module that performs a second noise cancellation operation on a noise signal in a preset second frequency band among the noise signal, and a control module that controls the first and second noise cancellation modules and controls the second noise cancellation module to selectively perform the second noise cancellation operation depending on whether the vehicle enters a tunnel.

According to an example, the first frequency band may include a frequency band for road noise, and the second frequency band may include a frequency band for in-tunnel noise.

According to an example, the control module may control the first noise cancellation module to perform the first noise cancellation operation both in response that the vehicle is located outside the tunnel and in response that the vehicle is located inside the tunnel.

According to an example, the control module may operate based on input tunnel entry information to determine a noise level before the vehicle enters the tunnel and a noise level after the vehicle enters the tunnel, and may control the operations of the first and second noise cancellation modules, based on a difference between the noise level before the vehicle enters the tunnel and the noise level after the vehicle enters the tunnel.

According to an example, tunnel entry expectation information, tunnel entry start information, and tunnel entry completion information may be sequentially input as the tunnel entry information.

According to an example, the control module may determine a level of a noise signal input between a time of receiving the tunnel entry expectation information and a time of receiving the tunnel entry start information, and may determine a level of a noise signal input between a time of receiving the tunnel entry start information and a time of receiving the tunnel entry completion information.

According to an example, the control module may output compensation level information corresponding to the difference to the first and second noise cancellation modules, the first noise cancellation module may change a level of a first noise cancellation sound according to the compensation level information to output the first noise cancellation sound, and the second noise cancellation module may change a level of a second noise cancellation sound according to the compensation level information to output the second noise cancellation sound.

According to an example, the control module may output upward compensation level information corresponding to an increased amount in response that the noise level after the vehicle enters the tunnel increases compared to the noise level before the vehicle enters the tunnel, and may output downward compensation level information corresponding to a decreased amount in response that the noise level after the vehicle enters the tunnel decreases compared to the noise level before the vehicle enters the tunnel.

According to an example, each of the first and second noise cancellation modules may perform a noise cancellation operation by outputting a noise cancellation sound having an inverted phase relative to a noise signal to be cancelled, and may change a level of the noise cancellation sound according to compensation level information to output the noise cancellation sound in response to receiving the compensation level information from the control module.

An active noise control method according to an example is an active noise control method for cancelling a noise signal provided by a sound sensor receiving noise outside a vehicle, which may include performing a first noise cancellation operation on a noise signal in a preset first frequency band among the noise signal by using a first noise cancellation module and performing a second noise cancellation operation on a noise signal in a preset second frequency band among the noise signal by using a second noise cancellation module, wherein the second noise cancellation operation may be selectively performed by a control module depending on whether the vehicle enters a tunnel.

According to an example, the first noise cancellation operation may be performed both in response that the vehicle is located outside the tunnel and in response that the vehicle is located inside the tunnel.

According to an example, the active noise control may further include determining a noise level before the vehicle enters the tunnel and a noise level after the vehicle enters the tunnel based on tunnel entry information by using the control module, and controlling the operations of the first and second noise cancellation modules by using the control module, based on a difference between the noise level before the vehicle enters the tunnel and the noise level after the vehicle enters the tunnel.

According to an example, the determining of the noise level before the vehicle enters the tunnel and the noise level after the vehicle enters the tunnel may include determining a level of a noise signal input between a time of receiving the tunnel entry expectation information and a time of receiving the tunnel entry start information, and determining a level of a noise signal input between a time of receiving the tunnel entry start information and a time of receiving the tunnel entry completion information.

According to an example, the controlling of the operations of the first and second noise cancellation modules may include outputting compensation level information corresponding to the difference to the first and second noise cancellation modules to control each of the first and second noise cancellation modules so as to change a level of an output noise cancellation sound.

According to an example, the controlling of the operations of the first and second noise cancellation modules may include outputting upward compensation level information corresponding to an increased amount in response that the noise level after the vehicle enters the tunnel increases compared to the noise level before the vehicle enters the tunnel, and outputting downward compensation level information corresponding to a decreased amount in response that the noise level after the vehicle enters the tunnel decreases compared to the noise level before the vehicle enters the tunnel.

According to an example, the performing of the first noise cancellation operation may include outputting a first noise cancellation sound having an inverted phase relative to the noise signal in the first frequency band, the performing of the second noise cancellation operation may include outputting a second noise cancellation sound having an inverted phase relative to the noise signal in the second frequency band, and the method may further include outputting the first and second noise cancellation sounds by changing levels of the first and second noise cancellation sounds, based on compensation level information from the control module.

A vehicle according to an example of the present disclosure is a vehicle including a sound sensor that receives noise outside a vehicle and outputs a noise signal corresponding to the noise, an information providing device that provides vehicle entry information in response that the vehicle enters a tunnel, and an active noise control system that performs a first noise cancellation operation on a noise signal in a preset first frequency band among the noise signal, performs a second noise cancellation operation on a noise signal in a preset second frequency band among the noise signal, and selectively performs the second noise cancellation operation by determining whether the vehicle enters the tunnel, based on the vehicle entry information.

According to an example, the vehicle may further include an operation control device that controls operation start and operation end of the active noise control system, and the active noise control system may perform the first noise cancellation operation in response to receiving an operation start signal from the operation control device, and may perform the second noise cancellation operation, based on the vehicle entry information, after performing the first noise cancellation operation.

According to an example, the vehicle may further include a user interface that outputs a noise compensation function activation signal, based on input control of a user, and the active noise control system may perform the first noise cancellation operation and the second noise cancellation operation, based on a difference between noise before the vehicle enters the tunnel and noise after the vehicle enters the tunnel, in response to receiving the noise compensation function activation signal.

In addition to the above-mentioned solutions to the technical subjects, detailed particulars according to various examples of the present disclosure are included in the following description and the accompanying drawings.

According to an example of the present disclosure, there may be provided a system and a method for actively controlling not only noise (road noise) occurring due to a vehicle coming in contact with the ground but also noise (in-tunnel noise) occurring during driving in a tunnel, and a vehicle including the same.

While a conventional method is capable of controlling road noise, using an active noise control technology according to an example of the present disclosure makes it possible to control both road noise and in-tunnel noise.

According to an example of the present disclosure, it is possible to provide a system and a method for actively controlling not only road noise but also in-tunnel noise by using a microphone used for conventional active noise control, and a vehicle including the same.

Accordingly, it is possible to achieve control of both road noise and in-tunnel while minimizing additional costs.

According to an example of the present disclosure, it is possible to provide a system and a method for actively controlling road noise and in-tunnel noise by reflecting the difference between noise levels before and after entry into a tunnel, and a vehicle including the same.

Accordingly, using an active noise control technology according to an example of the present disclosure makes it possible to effectively control road noise and in-tunnel noise and to reduce awareness of difference felt by a user due to an environmental change before and after entry into a tunnel.

Further, since in-tunnel noise may be controlled in a software manner, physical noise reduction work (e.g., attaching sound absorbers) in a tunnel may be reduced, and the time and costs for the work may be saved.

If an active noise control technology according to an example of the present disclosure is applied to a vehicle, the marketability and functionality of the vehicle may be improved, and vehicle sales may be expected to increase.

Advantageous effects of the present disclosure may not be limited to the above-mentioned effects, and other effects which are not mentioned may be clearly understood, through the following descriptions, by those skilled in the art to which the present disclosure pertains.

The above-mentioned subjects to be solved, solutions thereto, and advantageous effects are not intended to specify essential features of the claims, and thus the scope of protection of the claims is not limited by the description of the contents of the present disclosure.

Although examples of the present disclosure have been described above with reference to the accompanying drawings, the present disclosure is not necessarily limited to these examples and various modifications and changes may be made thereto without departing from the technical idea of the present disclosure. Therefore, the examples set forth herein are not intended to limit the technical idea of the present disclosure but intended to explain the technical idea of the present disclosure, and the scope of the technical idea of the present disclosure is not limited by these examples. Accordingly, the examples as described above should be construed as being illustrative and non-limitative in all examples. The scope of protection of the present disclosure should be de fined by the appended claims, and all technical ideas equivalent to the claims shall be construed as falling within the scope of protection of the present disclosure.

What is claimed is:

1. An apparatus for cancelling a noise signal, the apparatus comprising:

a sensor configured to detect noise outside a vehicle and generate the noise signal, wherein the noise signal is associated with the noise outside the vehicle;

a first noise cancellation circuit to generate a first noise cancellation signal associated with a first frequency band;

a second noise cancellation circuit to generate a second noise cancellation signal associated with a second frequency band;

one or more processors; and memory storing instructions, when executed by the one or more processors, cause the apparatus to:

control the first noise cancellation circuit to perform a first noise cancellation operation on a first noise signal, of the noise signal, in the first frequency band; and control, based on a determination that the vehicle enters an enclosed space, the second noise cancellation circuit to perform a second noise cancellation operation on a second noise signal, of the noise signal, in the second frequency band, wherein the second frequency band is associated with a portion of the detected noise that is generated while the vehicle is within the enclosed space.

2. The apparatus of claim 1, wherein the first frequency band comprises a frequency band for road noise, and the second frequency band comprises a frequency band for in-enclosed space noise.

3. The apparatus of claim 1, wherein the first frequency band comprises a first range of frequencies from 0 to 599 Hz and the second frequency band comprises a second range of frequencies from 601 to 3000 Hz.

4. The apparatus of claim 1, wherein the instructions, when executed by the one or more processors, further cause the apparatus to:

determine, based on enclosed space entry information, a first noise level before the vehicle enters the enclosed space and a second noise level after the vehicle enters the enclosed space, and control, based on a difference between the first noise level and the second noise level, the first noise cancellation operation and the second noise cancellation operation.

5. The apparatus of claim 4, wherein the enclosed space entry information sequentially comprises enclosed space entry expectation information, enclosed space entry start information, and enclosed space entry completion information, and wherein the instructions, when executed by the one or more processors, further cause the apparatus to:

determine a first level of a first noise signal input between a time of receiving the enclosed space entry expectation information and a time of receiving the enclosed space entry start information; and determine a second level of a second noise signal input between a time of receiving the enclosed space entry start information and a time of receiving the enclosed space entry completion information.

6. The apparatus of claim 4, wherein the instructions, when executed by the one or more processors, further cause the apparatus to:

output, based on the difference between the first noise level and the second noise level, compensation level information;

output, based on the compensation level information, a first noise cancellation sound; and output, based on the compensation level information, a second noise cancellation sound.

7. The apparatus of claim 4, wherein the instructions, when executed by the one or more processors, further cause the apparatus to:

output, based on the second noise level being higher than the first noise level, upward compensation level information; and output, based on the second noise level being lower than the first noise level, downward compensation level information.

8. The apparatus of claim 1, wherein the instructions, when executed by the one or more processors, further cause the apparatus to:

perform a noise cancellation operation by outputting a noise cancellation sound, wherein the noise cancellation sound comprises an inverted phase relative to a noise signal to be cancelled;

change, based on compensation level information, a level of the noise cancellation sound; and output the changed level of noise cancellation sound.

9. A method performed by an apparatus for cancelling a noise signal, the method comprising:

generating, based on a sensor of the apparatus detecting noise outside a vehicle, the noise signal;

generating, by a first noise cancellation circuit of the apparatus, a first noise cancelation signal associated with a first frequency band;

performing, by the first noise cancellation circuit of the apparatus, a first noise cancellation operation on a first noise signal, of the noise signal, in the first frequency band;

generating, by a second noise cancellation circuit of the apparatus and based on a determination that the vehicle enters an enclosed space, a second noise cancelation signal associated with a second frequency band; and performing, by the second noise cancellation circuit of the apparatus and based on the determination that the vehicle enters an enclosed space, a second noise cancellation operation on a second noise signal, of the noise signal, in the second frequency band, wherein the second frequency band is associated with a portion of the detected noise that is generated while the vehicle is within the enclosed space.

10. The method of claim 9, wherein the first frequency band comprises a frequency band for road noise, and the second frequency band comprises a frequency band for in-enclosed space noise.

11. The method of claim 9, further comprising:

determining, based on enclosed space entry information, a first noise level before the vehicle enters the enclosed space and a second noise level after the vehicle enters the enclosed space; and controlling, based on a difference between the first noise level and the second noise level, the first noise cancellation operation and the second noise cancellation operation.

12. The method of claim 11, wherein the enclosed space entry information sequentially comprises enclosed space entry expectation information, enclosed space entry start information, and enclosed space entry completion information, and wherein the determining the first noise level before the vehicle enters the enclosed space and the second noise level after the vehicle enters the enclosed space comprises:

determining a first level of a first noise signal input between a time of receiving the enclosed space entry expectation information and a time of receiving the enclosed space entry start information; and determining a second level of a second noise signal input between a time of receiving the enclosed space entry start information and a time of receiving the enclosed space entry completion information.

13. The method of claim 11, wherein the controlling the first noise cancellation operation and the second noise cancellation operation comprises:

outputting, based on the difference between the first noise level and the second noise level, compensation level information; and changing, based on the compensation level information, a level of an output noise cancellation sound.

14. The method of claim 11, wherein the controlling the first noise cancellation operation and the second noise cancellation operation comprises:

outputting, based on the second noise level being higher than the first noise level, upward compensation level information; and outputting, based on the second noise level being lower than the first noise level, downward compensation level information.

15. The method of claim 9, wherein the performing the first noise cancellation operation comprises outputting a first noise cancellation sound, wherein the first noise cancellation sound comprises an inverted phase relative to the first noise signal in the first frequency band, and wherein the performing the second noise cancellation operation comprises outputting a second noise cancellation sound, wherein the second noise cancellation sound comprises an inverted phase relative to the second noise signal in the second frequency band, further comprising outputting, based on compensation level information, the first noise cancellation sound and the second noise cancellation sound by changing a first level of the first noise cancellation sound and a second level of the second noise cancellation sounds.

16. A non-transitory computer-readable medium storing instructions for cancelling a noise signal, that when executed, cause:

a sensor of an apparatus to detect noise outside a vehicle and generate the noise signal, wherein the noise signal is associated with the noise outside the vehicle;

a first noise cancellation circuit of the apparatus to:

perform a first noise cancellation operation on a first noise signal, of the noise signal, in a first frequency band; and generate a first noise cancellation signal associated with the first frequency band;

a second noise cancellation circuit of the apparatus to:

perform, based on a determination that the vehicle enters an enclosed space, a second noise cancellation operation on a second noise signal, of the noise signal, in a second frequency band; and generate a second noise cancellation signal associated with the second frequency band, wherein the second frequency band is associated with a portion of the detected noise that is generated while the vehicle is within the enclosed space.

17. The non-transitory computer-readable medium of claim 16, wherein the first frequency band comprises a frequency band for road noise, and the second frequency band comprises a frequency band for in-enclosed space noise.

18. The non-transitory computer-readable medium of claim 16, wherein the instructions, when executed, cause the apparatus to:

determine, based on enclosed space entry information, a first noise level before the vehicle enters the enclosed space and a second noise level after the vehicle enters the enclosed space; and control, based on a difference between the first noise level and the second noise level, the first noise cancellation operation and the second noise cancellation operation.

19. The non-transitory computer-readable medium of claim 18, wherein the enclosed space entry information sequentially comprises enclosed space entry expectation information, enclosed space entry start information, and enclosed space entry completion information, and wherein the instructions, when executed, cause the apparatus to determine the first noise level before the vehicle enters the enclosed space and the second noise level after the vehicle enters the enclosed space by:

determining a first level of a first noise signal input between a time of receiving the enclosed space entry expectation information and a time of receiving the enclosed space entry start information; and determining a second level of a second noise signal input between a time of receiving the enclosed space entry start information and a time of receiving the enclosed space entry completion information.

20. The non-transitory computer-readable medium of claim 18, wherein the instructions, when executed, cause the apparatus to control the first noise cancellation operation and the second noise cancellation operation by:

outputting, based on the difference between the first noise level and the second noise level, compensation level information; and changing, based on the compensation level information, a level of an output noise cancellation sound.

* * * * *